United States Patent [19]

Farrior

[11] 4,269,457
[45] May 26, 1981

[54] ENDLESS TRACTION BAND SUPPORT APPARATUS

[75] Inventor: James S. Farrior, Huntsville, Ala.

[73] Assignee: Lockheed Missiles & Space Company, Inc., Sunnyvale, Calif.

[21] Appl. No.: 81,927

[22] Filed: Oct. 4, 1979

[51] Int. Cl.³ .................. B62D 55/20; B62D 55/24
[52] U.S. Cl. .................................. 305/11; 305/35 EB
[58] Field of Search ............... 305/35 R, 35 EB, 37, 305/38, 46, 11

[56] References Cited

U.S. PATENT DOCUMENTS

| | | |
|---|---|---|
| 1,869,290 | 7/1932 | Venzlaff et al. ............ 305/35 R X |
| 2,055,932 | 9/1936 | Kitchen . |
| 2,661,249 | 12/1953 | Bonmartini ..................... 305/38 |
| 3,068,712 | 12/1962 | Kuntzmann .................... 305/11 |
| 4,094,515 | 6/1978 | Araya et al. .................... 305/11 X |

FOREIGN PATENT DOCUMENTS 438805 8/1948 Italy .

Primary Examiner—Charles A. Marmor
Attorney, Agent, or Firm—Rodger N. Alleman; Thomas H. Olson

[57] ABSTRACT

A vehicle supporting endless traction band including an endless resilient band of concavo-convex transverse shape and a pair of assemblies for supporting and protecting opposite sides of the band. The assemblies are similar to conventional roller chains except that the inner support links (those adjacent the sides of the band) are configured to pivot on the chain studs and to define slots into which the side margins of the band are received. A plurality of tension resistant members obliquely span the space between the roller chain assemblies on the concave side of the band to prevent the band from buckling when subjected to concentrated loads.

5 Claims, 4 Drawing Figures

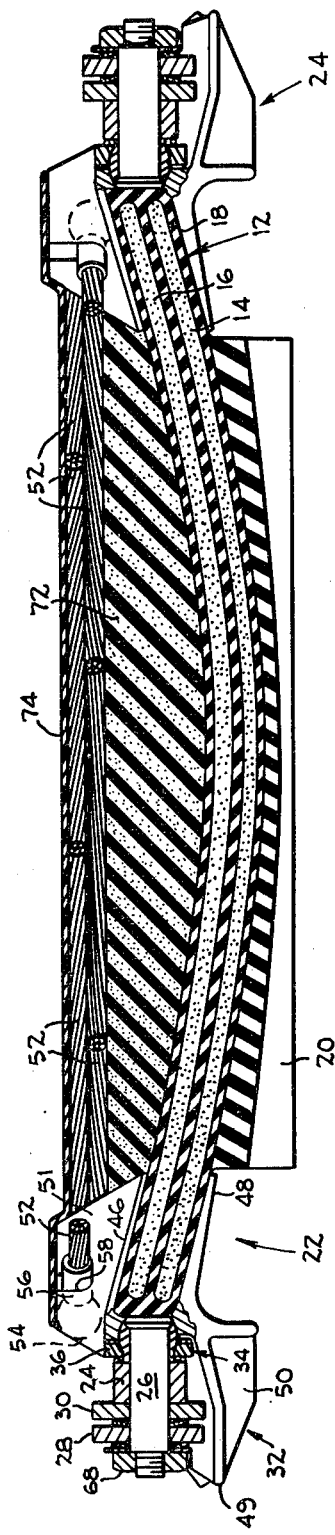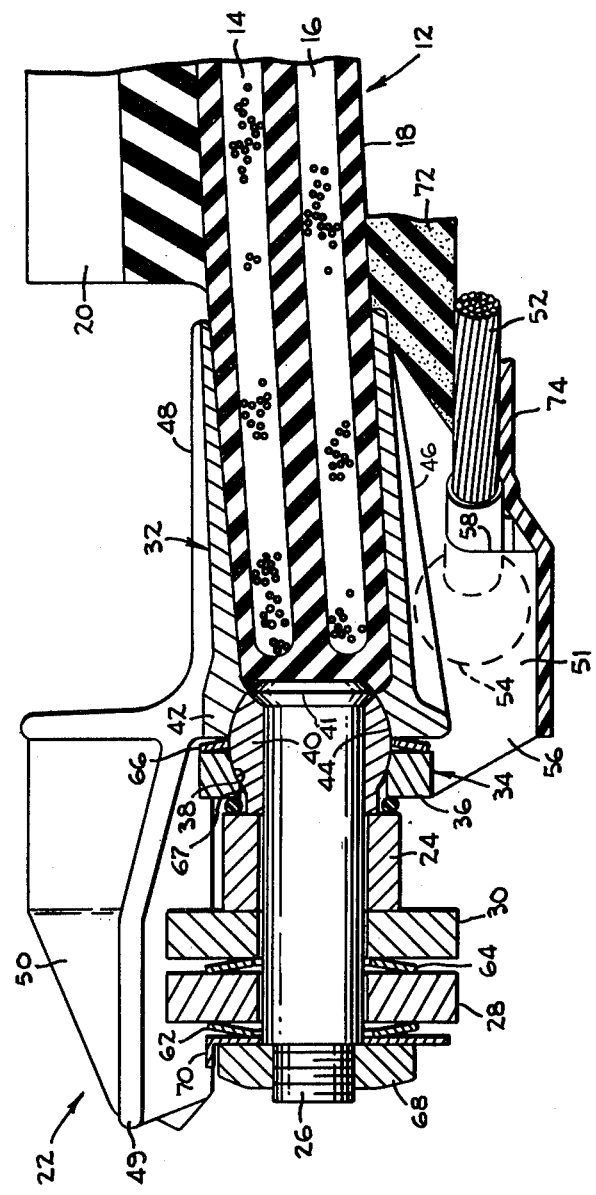

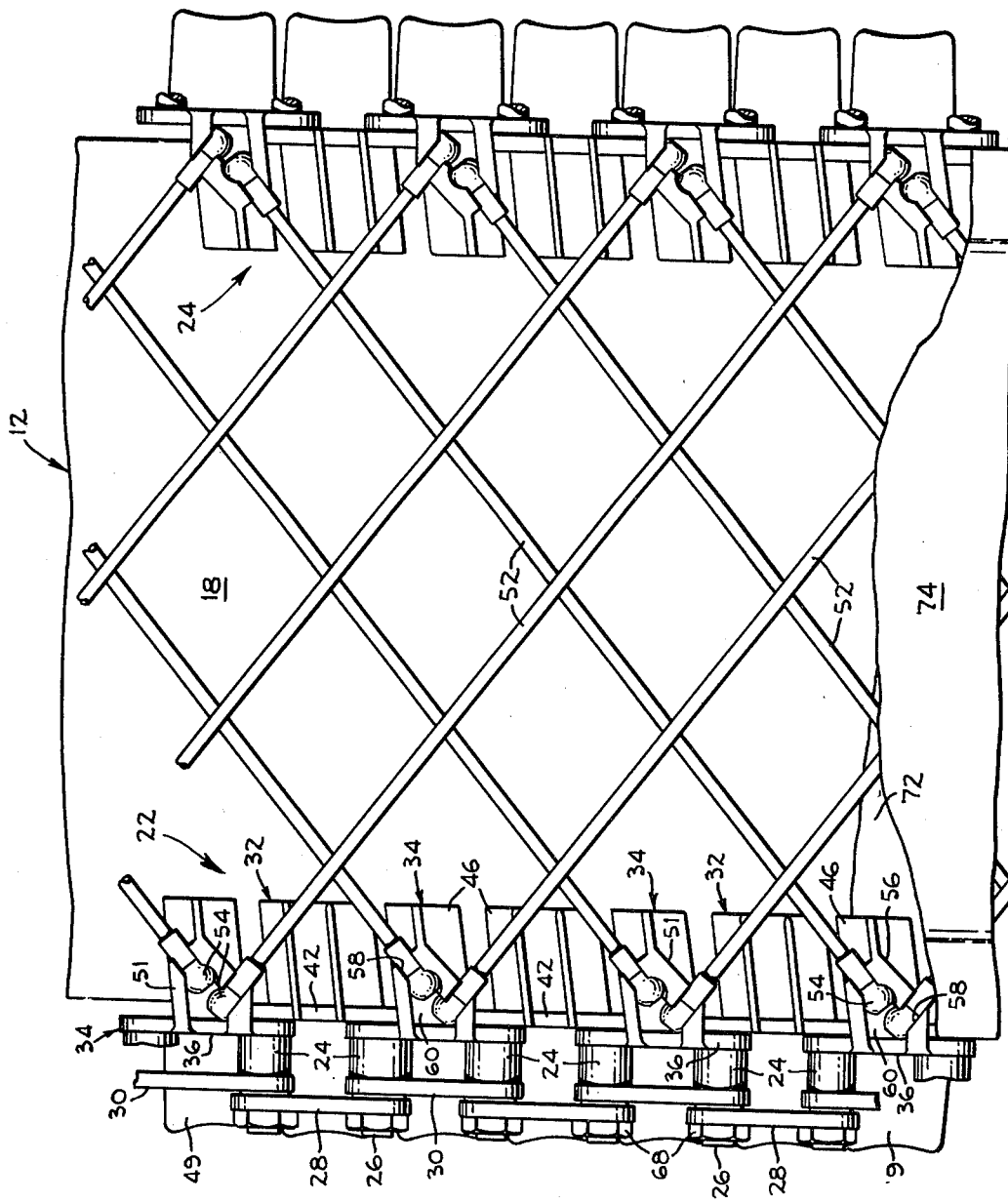

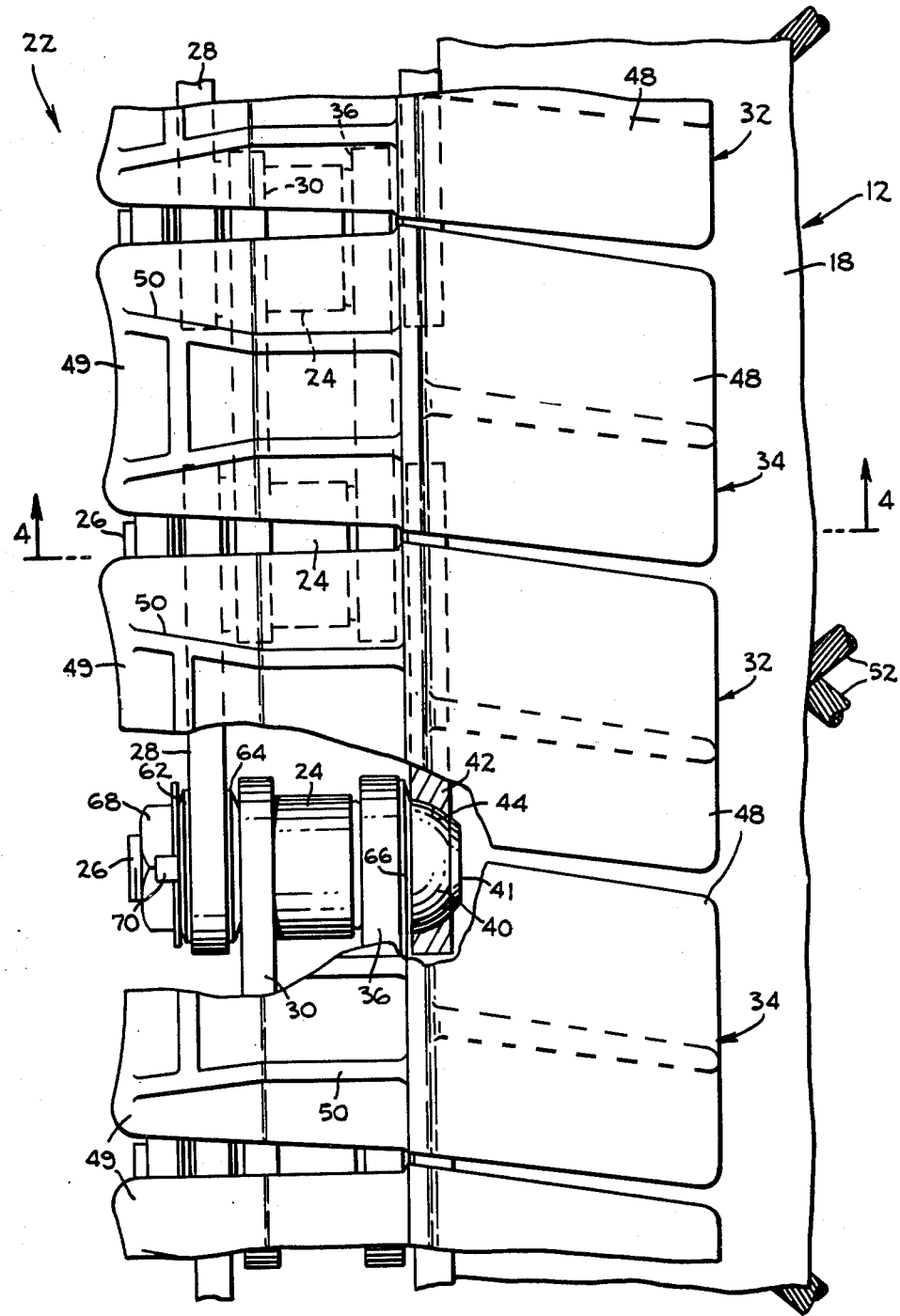

ENDLESS TRACTION BAND SUPPORT APPARATUS

BACKGROUND OF THE INVENTION

1. Field of the Invention

This invention relates to vehicle traction apparatus of the type including an endless concavo-convex band or loop wheel and more particularly to apparatus for supporting the band on a vehicle to improve its load supporting characteristics and to improve its longevity.

2. Description of the Prior Art

Italian Pat. No. 438,805 and U.S. Pat. No. 2,055,932 disclose structures that incorporate an endless band of concavo-convex configuration for use as a traction member on a vehicle. Because neither of the prior art structures includes mechanism for supporting the side edges of the endless band their load capabilities are extremely low and their longevity is poor.

Commonly owned U.S. patent application Ser. No. 867,428, filed Jan. 6, 1978 by Wolfgang Trautwein discloses an endless traction band and edge support structure therefor that is far superior to the systems disclosed in the references noted in the preceding paragraph. The band disclosed in the Trautwein application is retained in positive sprocket engagement by means of transversely extending stud bands having at opposite ends threaded studs which are installed coaxially with roller chain rollers disposed at opposite side edges of the endless band. Although such system has good load supporting characteristics, its longevity is reduced because of the flexure of the bands and studs that are experienced during operation.

SUMMARY OF THE INVENTION

According to the present invention there is an endless roller chain supported at each edge of the endless band. The links on the outer side of the roller chain remote from the endless band are substantially conventional but the links on the inner side adjacent the band are formed to perform two functions: to constitute a part of the chain in resisting tension loads applied thereto and to engage and protect the edge margins of the endless band. The studs that extend through the rollers and retain the links and rollers in assembled relation have at the inner end a spherical enlargement with which correspondingly shaped sockets in the links adjacent the endless band cooperate to afford limited pivotal movement. Accordingly, as the endless band flexes in response to loads or in response to movement around the sprockets that support the structure, the pivotal movement avoids overstressing any of the parts.

The loads that can be supported by a traction system of the type under consideration is limited by the resistance to buckling possessed by the endless band. In operation over smooth surfaces substantial loads can be supported, but on terrain where sharp protrusions are likely to be encountered, contact with such protrusion imparts a concentrated force on the band which can cause it to buckle. According to the present invention, there is provided in spanning relation to the endless band on the concave side thereof a plurality of tension resistant members which retain the band in a curved, load supporting configuration even in the presence of concentrated forces thereon that result from contact with a sharp protrusion. The modified inner links of the roller chain, referred to above, are adapted for engaging opposite ends of the tension resistant members.

To facilitate movement of a track according to the invention around the sprockets disposed at opposite ends thereof, the above mentioned tension resistant members extend diagonally or obliquely of the direction of movement of the band. Accordingly one end of each tension resistant member moves around the sprocket ahead of or behind the other end of such member.

The objects, features, and advantages of the present invention will be more apparent after referring to the following specification and the accompanying drawings.

BRIEF DESCRIPTION OF THE DRAWINGS

FIG. 1 is a cross section view transverse of an endless traction band embodying the invention.

FIG. 2 is a fragmentary top view of the band of FIG. 1.

FIG. 3 is a fragmentary bottom view of a portion of FIG. 1 at enlarged scale.

FIG. 4 is a cross-sectional view taken along line 4—4 of FIG. 3.

DETAIL DESCRIPTION OF A PREFERRED EMBODIMENT

The supporting and driving mechanism for an endless traction band embodying the invention is equivalent to that shown in commonly owned U.S. patent application Ser. No. 867,428, filed Jan. 6, 1978 and entitled IMPROVED LOOP TRACK MOBILITY SYSTEM; the disclosure of the support and drive system from the above cited co-pending application is incorporated herein by this reference. Referring more particularly to the drawings, an endless band 12 is formed of two resilient cores 14 and 16 which, as disclosed in the above cited co-pending application, are formed of a plurality of filaments adhered to one another to form the cores in a concavo-convex shape as seen in FIG. 1. Surrounding the cores and extending therebetween is a body 18 of flexible material such as rubber which can be reinforced with fibers or cords. As can be seen in FIG. 1, the exterior surface of rubber body 18 is also of concavo-convex configuration. To the convex surface of rubber body 18 a hard rubber tread 20 is bonded, the rubber tread constituting the exterior and ground contacting portion of the endless traction band.

Opposite side margins of band 12 are supported by assemblies designated generally at 22 and 24 in FIG. 1. Assemblies 22 and 24 include roller chains which are engaged in sprockets, not shown herein, but disclosed in the above cited co-pending application. Also as disclosed in the co-pending application, the endless band 12 is formed of resilient material which normally resides in the concavo-convex shape shown in FIG. 1. Such material is sufficiently flexible however, that it can be deformed to a substantially flat condition as it moves around the sprockets which support and drive the roller chain. The strength of cores 14 and 16 determines the load carrying capability of a given structure.

Because side margin support assemblies 22 and 23 are substantially identical to one another, a description of one will suffice as a description of both. Referring to FIGS. 3 and 4, edge support assembly 22 includes a roller chain having a plurality of rollers 24 which are supported for rotation on studs 26, the distance between adjacent studs being uniform throughout the length of the roller chain and determining the pitch thereof. On the outer side of the roller chain remote from endless band 12 there is a series of more or less conventional outer links 28 which alternate with a series of more or less conventional inner links 30, the links having holes in their opposite ends to accommodate studs 26. On the inner side of the roller chain adjacent endless band 12 are inner support links 32 and outer support links 34. Support links 32 and 34 perform several functions, one of which is to cooperate with links 28 and 30 to complete the roller chain assembly.

Outer support link 34 has an elongate body portion 36, the opposite ends of which define holes 38 which are spaced on centers equal to the pitch of the roller chain. As can be seen most clearly in FIG. 4, holes 38 have a spherical configuration of the same radius of curvature as a spherical enlargement 40 which is mounted on the end of each stud 26 and there retained by a flat head 41. Body portion 36 of outer support link 34 has a thickness less than the radius so that a portion of spherical enlargement 40 extends beyond, i.e. to the right as viewed in FIG. 4, body portion 36. Inner support link 32 has a similarly dimensioned elongate body portion 42 which defines spherical holes 44 spaced from one another by a distance equal to the pitch of the roller chain. Holes 44 engage the portion of spherical enlargement 40 that extends beyond body portion 36.

Extending inward from the body portions of support links 32 and 34 are substantially identical upper flanges 46 and lower flanges 48 which are vertically spaced from one another by an amount corresponding to the thickness of band 12 so as to provide a slot that receives the side margin of the band therebetween and supports and protects the same. As can be seen in FIG. 4, the slot between the flanges is slightly narrower at the inner or left-hand extremity thereof so as to assure frictional engagement between the side margins of band 12 and the inner surfaces of the flanges. Such frictional engagement transfers the force imparted to the roller chain to the endless band 12. As can be seen in FIG. 3, there is a gap between the edges of adjacent flanges so as to permit the roller chain to flex as it passes over the sprockets.

Extending outward from the respective body portions of support links 32 and 34 is a chain protector plate 49 which overlies rollers 24, studs 26 and links 28 and 30 to exclude dirt and the like therefrom. Chain protector plate 49 can be provided with one or more strengthening ribs 50 as seen in FIG. 4.

On the inner portion of support link 34 (i.e. the portion remote from tread 20) there is an integral boss 51 for receiving and retaining the ends of tension resistant members 52. An exemplary structure for retaining the ends of the tension resistant members is a ball fitting 54 which is crimped onto the end of the tension members, boss 51 having a wall 56 that defines a slot 58 having a cross-sectional shape corresponding to that of the tension resistant member. A relieved volume 60 interior of wall 56 accommodates ball 54 so that the ends of tension resistant members 52 are retained while under tension to outer support links 34.

As can be seen in FIG. 2, tension resistant members 52 extend diagonally or obliquely so that one end of each tension member 52 leads the opposite end of the same tension member in order to assure that when the assembly moves over the relatively small diameter sprockets, deformation of band 12 into a substantially flat transverse shape is made possible. In one structure designed in accordance wih the invention the angle between tension members 52 and the direction of movement of the band is about 55°, an angle in the range of about 40° to about 70° being considered the approximate preferred range. It will be appreciated that the specific angle depends on the chain pitch, the diameter of the sprockets, the overall width of the endless track, and like parameters.

Before a description of the assembly and operation of an endless traction band embodying the invention, it should be noted in FIG. 4 that there are resilient compression washers 62, 64 and 66 on stud 26 and between the parts carried on the stud. Such compression washers are stressed by appropriate adjustment of a nut 68 threaded on the protruding end of stud 26, a retainer 70 being provided to lock the nut in place after it is tightened. Compression washers 62, 64 and 66 and elastic seal 67 serve to prevent contamination of the lubricated internal bearing surfaces during operation.

In assemblying the support structure of the invention, support links 32 are installed onto the edge of the band 12. Next, a spherical enlargement 40 is placed on a stud 26 and such is introduced through hole 38 in each end of outer support link 34. The support link is then pressed onto the side margin of band 12 so that the edge of the band retains the enlargement and the stud in place within hole 38 of support link 34 and hole 44 of support links 32. Finally, rollers 24, links 28 and 30, compression washers 62, 64 and 66, seal 67 and nut 68 are installed and assembly is completed. Next tension resistant members 52 are installed in a crisscross pattern as shown in FIG. 2 and are dimensioned such as to slightly stress band 12 into a somewhat more curved position than it would assume if unloaded. When the assembled apparatus is installed under load rollers and engaged in sprockets as disclosed in the aforecited co-pending application the system is ready for operation. As the tread 20 encounters small protuberances, substantial localized loads are imposed on band 12, the magnitude of such loads at high speeds exceeding at times the buckling strength of cores 14 and 16. The presence of tension resistant members 52, however, prevents endless band 12 from buckling even under such high concentrated loads because the tension resistant members limit the outward movement of the edges of the endless band to prevent such buckling. Consequently the inclusion of tension resistant members 52 significantly improves the load carrying capability of a given structure without materially adding to the weight thereof.

It is desirable to exclude dirt, small stones and the like from entry between tension resistant members 52 and the concave surface of band 12. For this purpose (see FIG. 1) the space between the concave surface of endless band 12 and tension resistant members 52 is filled with foam rubber or like closed cell material indicated at 72, and a fabric reinforced elastomer cover sheet is adhesively secured over the tension resistant members and bosses 50 so as to exclude dirt and the like. Because foam material 72 and cover sheet 74 are extremely light weight, they do not add materially to the overall weight of the structure.

Band 12 experiences almost continuous flexure as it moves over irregular ground surfaces and as it moves around the relatively small diameter of the sprockets that support the roller chains. Because of the presence of spherical enlargement 40 and the spherical surfaces of holes 38 and 44, a sufficient degree of pivotal movement is afforded so that the flexure of the band does not cause undue wear to the supporting mechanism.

Thus it will be seen that the present invention provides an improved endless traction band support and drive system which is capable of supporting greater loads, which has far better longevity than known prior art devices, and which can be embodied without significant increase in weight. Although one embodiment of the invention has been shown and described it will be obvious that other adaptations and modifications can be made without departing from the true spirit and scope of the invention.

What is claimed is:

1. Traction apparatus for a vehicle comprising first and second roller chains, means for supporting said roller chains on said vehicle for movement on parallelly spaced apart congruent paths which paths include a linear portion beneath the vehicle, a resilient endless band having a length corresponding to that of said roller chains and a width such as to span the space between said roller chains, said band having a convex outer surface and a concave inner surface and being resiliently deformable in response to loads imposed thereon, and means for attaching respective side edges of said band to respective said roller chains so that in response to movement of said roller chains along said paths said band will correspondingly move, said attaching means including means for engaging the side margins of said band, said engaging means including a body portion outward of said band, said body portion having at least a first spherical hole therein, said roller chain including at least a first stud, a spherical enlargement fixed to said first stud, said spherical enlargement engaging said first spherical hole to afford pivotal movement between said engaging means and said roller chain.

2. Traction apparatus according to claim 1 wherein said body defines a second spherical hole spaced from said first spherical hole by a distance corresponding to the pitch of the roller chain, said roller chain including a second stud spaced from said first stud by a distance corresponding to the pitch of the roller chain, said second stud having a spherical enlargement fixed thereto, last said spherical enlargement engaging said second spherical hole.

3. Traction apparatus according to claim 1 including means circumscribing said stud and contacting said body portion for excluding contaminates from the surfaces of said spherical hole and said spherical enlargement.

4. Traction apparatus according to claim 1 including a plurality of attaching means for engaging the side margins of said band, said plurality including a series of substantially identical outer band engaging members and a series of inner band engaging members disposed on said band in alternation with said outer band engaging members, said outer and inner band engaging members each having a body wherein said first spherical hole is disposed at one end thereof, said body having a second spherical hole spaced from said first spherical hole by a distance corresponding to the pitch of the roller chain, said body of said outer band engaging member having a thickness less than the radius of said spherical enlargement so as to retain said spherical enlargement and said stud against movement outward of the roller chain path and so as to expose a portion of said spherical enlargement inward of said body, the body of said inner band engaging member also including first and second spaced apart spherical holes, last said spherical holes engaging the exposed portions of said spherical enlargements to afford independent pivotal movement of said inner and outer band engaging means.

5. Traction apparatus according to claim 1 including a resilient compression washer circumscribing and sealing said spherical enlargement between the bodies of said outer and inner band engaging members, said washer biasing said bodies into substantial parallellism and being yieldable to afford pivotal movement of said bodies relative said roller chain.

* * * * *

UNITED STATES PATENT OFFICE
CERTIFICATE OF CORRECTION

Patent No. 4,269,457          Dated May 26, 1981

Inventor(s) James S. Farrior

It is certified that error appears in the above-identified patent and that said Letters Patent are hereby corrected as shown below:

Column 1, line 4, immediately after the title, insert --The Government has rights in this invention pursuant to Contract No. DAAK 30-79C-0057 awarded by the Department of the Army, Tank Automotive Command, Warren, Michigan.--

Signed and Sealed this

Sixth Day of July 1982

[SEAL]

Attest:

Attesting Officer

GERALD J. MOSSINGHOFF

Commissioner of Patents and Trademarks